(12) United States Patent
Eiden

(10) Patent No.: US 6,773,644 B1
(45) Date of Patent: Aug. 10, 2004

(54) METHOD OF MAKING ILLUMINATED COVERS

(75) Inventor: Niko Eiden, Espoo (FI)

(73) Assignee: Nokia Corporation, Espoo (FI)

( * ) Notice: Subject to any disclaimer, the term of this patent is extended or adjusted under 35 U.S.C. 154(b) by 58 days.

(21) Appl. No.: 10/036,478

(22) Filed: Jan. 7, 2002

Related U.S. Application Data

(63) Continuation-in-part of application No. 09/940,624, filed on Aug. 29, 2001.

(51) Int. Cl.$^7$ .......................... B29C 33/12; B29C 45/14
(52) U.S. Cl. ...................... 264/132; 264/135; 264/154; 264/250; 264/254; 264/259; 264/275
(58) Field of Search ............................... 264/129, 132, 264/134, 135, 138, 139, 154, 155, 156, 161, 163, 250, 254, 255, 259, 263, 265, 266, 271.1, 275, 278; 156/196, 219, 220, 245

(56) References Cited

U.S. PATENT DOCUMENTS

| | | | |
|---|---|---|---|
| 3,298,558 A | | 1/1967 | Michel |
| 3,989,775 A | * | 11/1976 | Jack et al. .................. 264/1.9 |
| 4,205,036 A | * | 5/1980 | Trame ....................... 264/132 |
| 4,330,578 A | | 5/1982 | Nishihira et al. |
| 4,406,045 A | * | 9/1983 | Schwab ..................... 29/527.2 |
| 4,495,125 A | | 1/1985 | Hatakeyama et al. |
| 4,885,663 A | | 12/1989 | Parker |
| 4,994,224 A | | 2/1991 | Itoh et al. |
| 5,005,108 A | | 4/1991 | Pristash et al. |
| 5,227,222 A | * | 7/1993 | Ogawa et al. ........... 428/195.1 |
| 5,363,294 A | | 11/1994 | Yamamoto et al. |
| 5,512,226 A | * | 4/1996 | Rosica et al. ............... 264/132 |
| 5,567,362 A | * | 10/1996 | Gr un ....................... 264/1.31 |
| 5,780,965 A | * | 7/1998 | Cass et al. .................. 313/506 |
| 5,895,115 A | | 4/1999 | Parker et al. |
| 5,989,480 A | | 11/1999 | Yamazaki |
| 6,016,038 A | | 1/2000 | Mueller et al. |
| 6,079,838 A | | 6/2000 | Parker et al. |
| 6,117,384 A | | 9/2000 | Laurin et al. |
| 6,137,221 A | | 10/2000 | Roitman et al. |
| 6,150,774 A | | 11/2000 | Mueller et al. |
| 6,166,496 A | | 12/2000 | Lys et al. |
| 6,211,626 B1 | | 4/2001 | Lys et al. |
| 6,229,259 B1 | | 5/2001 | Christensen, Sr. |
| 6,292,901 B1 | | 9/2001 | Lys et al. |

FOREIGN PATENT DOCUMENTS

| | | |
|---|---|---|
| EP | 0 564 127 A2 | 3/1993 |
| EP | 932 288 A1 * | 7/1999 |
| EP | 1109360 | 6/2001 |
| EP | 1 109 380 A2 | 6/2001 |
| JP | 10 134960 A | 5/1998 |
| JP | 10134960 | 5/1998 |

* cited by examiner

Primary Examiner—Angela Ortiz
(74) Attorney, Agent, or Firm—Antonelli, Terry, Stout & Kraus, LLP

(57) ABSTRACT

As illuminated cover, a method of making such a cover, and a covered electronic device. An electroluminescent foil overlies a thin, rigid support base, and an insulating foil overlies the electroluminescent foil. A first opening allows insertion of an electrical connector for the electroluminescent foil. A second opening allows insertion of a control key of an electronic device covered by the decorative cover. The covered electronic device further includes a printed circuit board having electronic components mounted on it, including the control key. A connector extends into the first opening to connect the electroluminescent foil to circuitry on the printed circuit board so as to provide electrical power to the electroluminescent foil. A second base cooperates with the support base to enclose the electronic device. A graphic can be included between the electroluminescent foil and the insulating foil. The cover is made by a molding method.

25 Claims, 4 Drawing Sheets

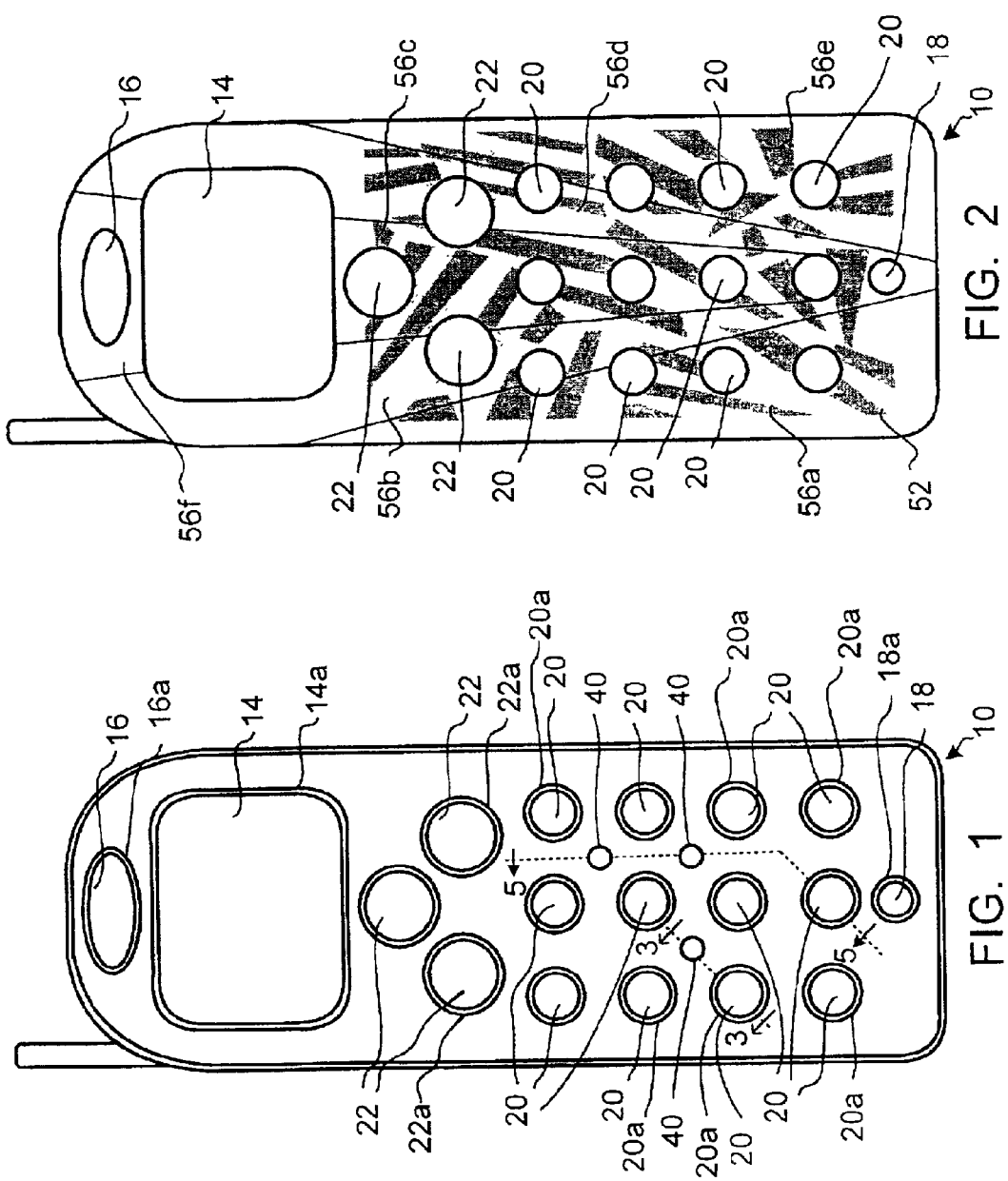

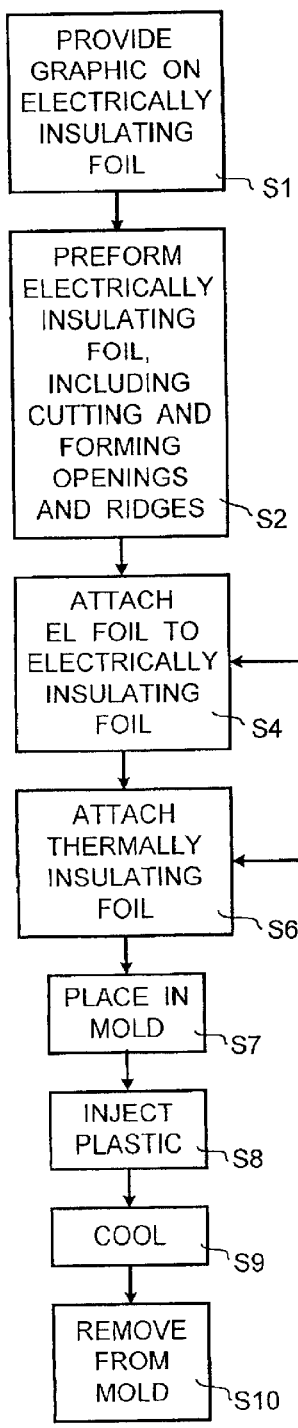
FIG. 7
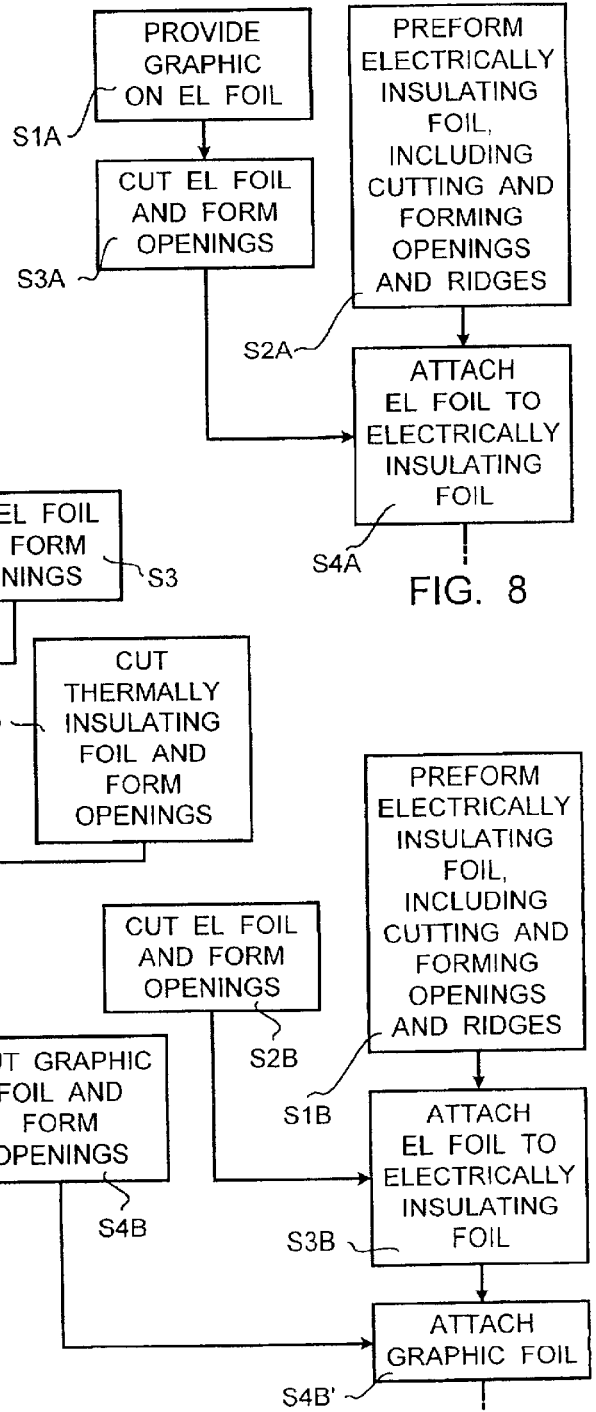
FIG. 8
FIG. 9

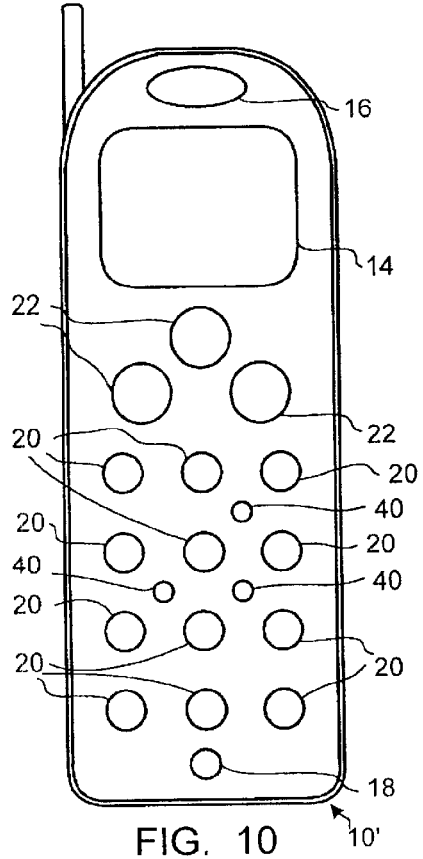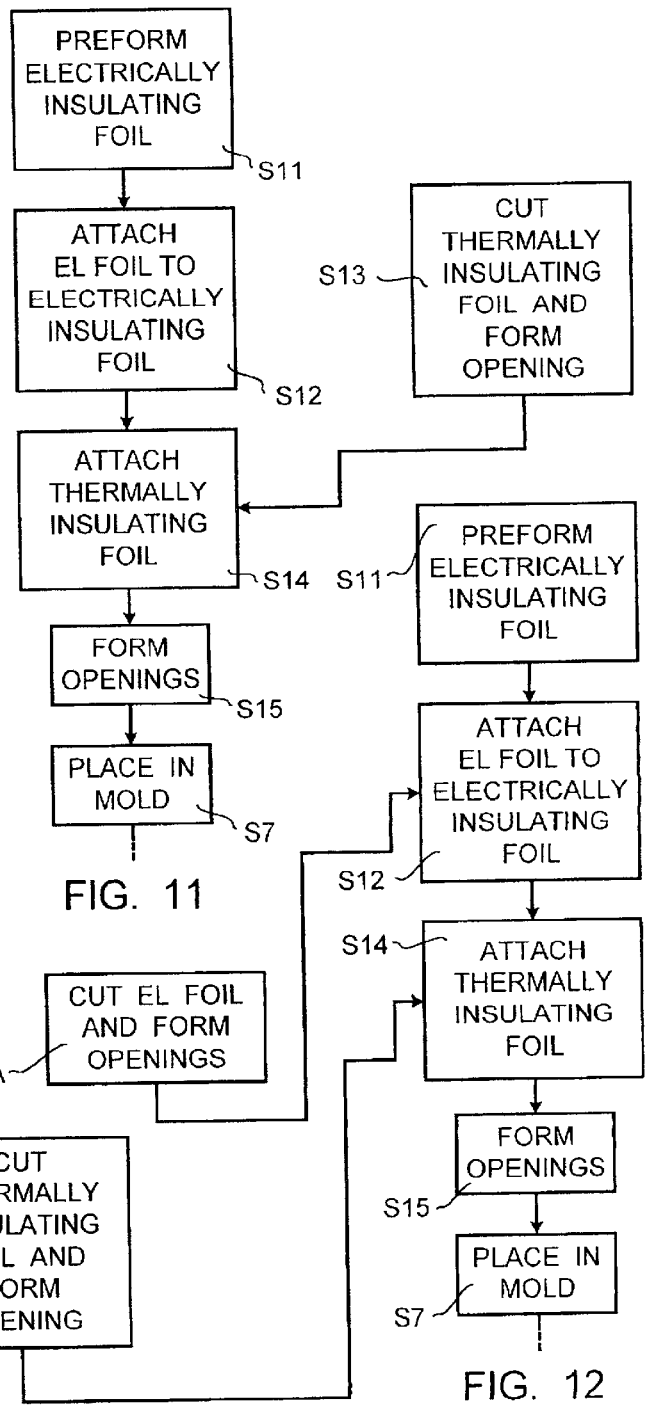
FIG. 10
FIG. 11
FIG. 12

METHOD OF MAKING ILLUMINATED COVERS

CROSS-REFERENCE TO RELATED APPLICATIONS

This application is a continuation-in-part of U.S. patent application Ser. No. 09/940,624 filed Aug. 29, 2001.

FIELD OF THE INVENTION

The present invention pertains to illuminated covers for electronic devices such as cellular telephones. More particularly, the present invention pertains to decorative illuminated covers. The present invention also pertains to an electronic device having an illuminated cover, which might be a decorative illuminated cover. Additionally, the present invention pertains to a method of forming a device cover, including a decorative illuminated cover.

BACKGROUND OF THE INVENTION

Portable electronic devices, such as cellular telephones, are becoming widely used. Many people desire to have a unique appearing portable electronic device, particular a cellular telephone, not only for its attractiveness, but also to enable them to identify their own phone or other device from devices belonging to other people.

People often have a cellular telephone when in locations in which the ringing of the telephone is undesirable. In such situations, the ringer of the telephone can be shut-off. However, if a call is placed to the telephone while the ringer is off, the user does not know about the call unless there is some other way to indicate its arrival. While some cellular telephones retain a visual indication of unanswered calls, indicating the calling number, the user of such a phone is unlikely to learn of the call until he or she happens to activate the phone next. This may be a considerable time after the call was placed. If the call related to time sensitive information, the user may lose the benefit of the information because he or she did not notice the call soon enough. While a number of light emitting diodes can be incorporated within the cover of a device such as a cellular telephone, so as to be illuminated in response to the ringing current of the telephone, because of power requirements it is impractical to provide a significant illuminated decorative pattern of light emitting diodes.

An electroluminescent foil can be utilized to provide a lighted pattern on a electronic device such as a cellular telephone. However, electroluminescent foils require high ac voltage, in the range of from about 20 volts to about 240 volts at from about 50 Hz to about 300 Hz. Consequently, the electroluminescent foil has to be insulated from the person utilizing the electronic device. Satisfactory insulation can be provided by laminating an electrically insulating foil onto the outer surface of the electroluminescent foil. The combined foils then must be adhered to a support base shaped to provide the desired cover for the electronic device. Such a support base can be formed by placing the combined foils in a mold and injecting plastic or other suitable material. By way of examples, U.S. Pat. Nos. 3,298,558, 4,330, 578, 4,495,125, 4,994,224, 5,989,480, and 6,117,384, the disclosures of which are incorporated herein by reference, show techniques for molding plastic articles with decorative patterns.

The support base must have openings through it for passage of control keys of the portable electronic device. Thus, openings must be provided through the electrically insulating foil and the electroluminescent foil. Many electroluminescent foils are fragile and tear easily. Thus, punching an opening in such a foil can cause irreparable damage. Consequently, it is desirable to form the openings during formation of the electroluminescent foil, for example by a printing process. Alternatively, openings might be formed in the electroluminescent foil, for example by punching, before the electroluminescent foil is laminated on the electrically insulating foil, so that any torn or otherwise damaged electroluminescent foil can be discarded or repaired before it is laminated on the electrically insulating foil, avoiding wasting of the electrically insulating foil.

If openings are formed in the electrically insulating foil and the electroluminescent foil before the foils are laminated, the foils must be accurately positioned to assure that the openings through the two foils are aligned. This can be extremely difficult to achieve.

It is necessary for the electroluminescent foil to be connected to a power source. Japanese Patent Publication 10-134960 dated May 22, 1998 shows a molded electroluminescent device having a flexible lead for connection to a power source. However, it is difficult to provide a flexible lead for such connection when the combined foils are adhered to the rigid support base by molding. Frequently, the flexible lead is damaged or destroyed during the molding process, resulting in considerable waste.

SUMMARY OF THE INVENTION

To overcome limitations in the prior art described above, and to overcome other limitations that may be apparent upon reading the present specification, the present invention is directed to a device cover and a covered electronic device such as a cellular telephone. In addition, the present invention is directed to a method of forming a device cover for an electronic device. A device cover in accordance with the present invention has a predetermined shape and includes a thin, rigid support base shaped in accordance with the predetermined shape. An electroluminescent foil overlies a first surface of the support base. An electrically insulating foil overlies the electroluminescent foil. If desired, a graphic can be positioned between the electrically insulating foil and the electroluminescent foil. Further, if desired, a thermally insulating foil can be positioned between the support base and the electroluminescent foil to protect the graphic from excessive heat during manufacture of the illuminated cover. However, if no graphic is included, then the thermally insulating foil can be omitted. Likewise, if the graphic would not be damaged by the heat, the thermally insulating foil can be omitted. The support base, the thermally insulating foil, the electroluminescent foil and the electrically insulating foil have a first opening therethrough for insertion of a control key of a device to be covered by the decorative cover. The support base and the thermally insulating foil have a second opening therethrough for insertion of an electrical connector to connect the electroluminescent foil to an electrical power source so as to provide power to the electroluminescent foil. A ridge is formed around the first opening through the electrically insulating foil. The opening through the electroluminescent foil has a diameter enabling the electroluminescent foil opening to surround the electrically insulating foil ridge, accurately positioning the electroluminescent foil on the electrically insulating foil.

A covered electronic device in accordance with the present invention further includes a printed circuit board having a plurality of electronic components mounted on it which are electrically interconnected to form an electronic unit, such as a cellular telephone. The electrical components include a control key for the electronic unit, with the control key extending through the first opening in the decorative cover. The covered electronic device additionally includes a connector extending into the second opening of the decorative cover to connect the electroluminescent foil to circuitry on the printed circuit board so as to provide electrical power to the electroluminescent foil. A second cover member or base cooperates with the support base to enclose the printed circuit board and electronic components, providing a covered electronic device.

In accordance with a preferred embodiment of the present invention, the method of forming a device cover having a predetermined shape includes forming a preliminary cover member by attaching a first surface of an electroluminescent foil to a first surface of an electrically insulating foil, the electrically insulating foil having the predetermined shape and having a first opening therethrough, the electroluminescent foil having an opening therethrough corresponding with the first opening through the electrically insulating foil; placing the preliminary cover member in a mold of the predetermined shape, the mold having bosses corresponding with the first opening and with a second opening; and injecting plastic into the mold and into contact with the preliminary cover member to form the decorative cover, the bosses providing openings through the plastic corresponding with the first and second openings.

The method further may include, before forming the preliminary cover member, preforming the electrically insulating foil to the predetermined shape and forming the first opening through the electrically insulating foil. In a particularly preferred embodiment, the preforming includes forming a ridge around the first opening through the electrically insulating foil, and the electroluminescent foil is attached to the electrically insulating foil with the electroluminescent foil opening surrounding the ridge on the electrically insulating foil to position the electroluminescent foil on the electrically insulating foil. The method may also include forming the opening through the electroluminescent foil. Additionally, the method may include providing a graphic between the electrically insulating foil and the electroluminescent foil, and if desired attaching a thermally insulating foil beneath the electroluminescent foil.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

FIG. 1 is a plan view of the underside of an embodiment of an illuminated cover for an electronic device such as a cellular telephone in accordance with the present invention;

FIG. 2 is a plan view of the outer side of an embodiment of a decorative illuminated cover for an electronic device such as a cellular telephone in accordance with the present invention;

FIG. 6 is a plan view of a preferred embodiment of a second cover member in accordance with the present invention.

FIG. 7 is a flowchart of an embodiment of a method of manufacturing an illuminated cover in accordance with the present invention;

FIG. 8 is a partial flowchart illustrating alternative steps in another embodiment of a method of manufacturing an illuminated cover in accordance with the present invention;

FIG. 9 is a partial flowchart illustrating alternative steps in still another embodiment of a method of manufacturing an illuminated cover in accordance with the present invention;

FIG. 10 is a plan view of the underside of another embodiment of an illuminated cover for an electronic device such as a cellular telephone in accordance with the present invention;

FIG. 11 is a partial flowchart illustrating alternative steps in yet another embodiment of a method of manufacturing an illuminated cover in accordance with the present invention; and FIG. 12 is a partial flowchart illustrating alternative steps in another embodiment of a method of manufacturing an illuminated cover in accordance with the present invention.

DETAILED DESCRIPTION OF PREFERRED EMBODIMENT

Figure 3:
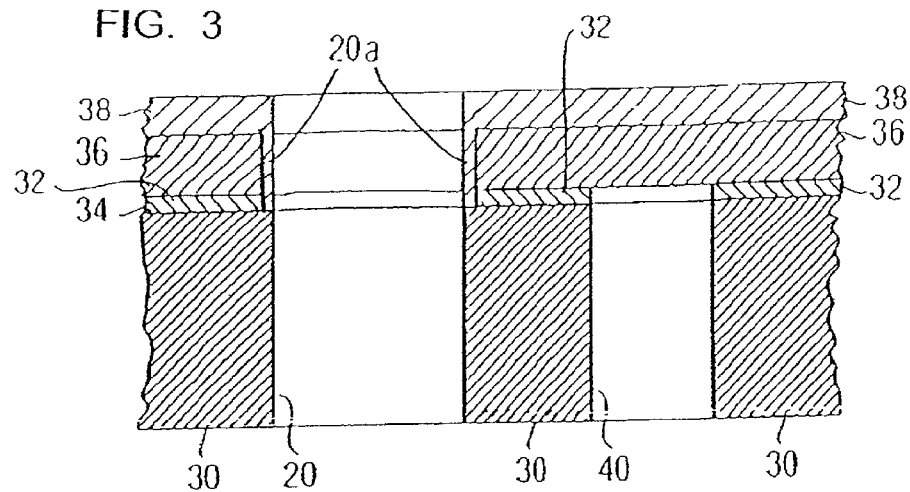
FIG. 3 is an enlarged fragmentary view taken along line 3—3 in FIG. 1 and depicting an embodiment of an illuminated cover in accordance with the present invention.

In the following description of various embodiments, reference is made to the accompanying drawings which form a part hereof, and in which are shown by way of illustration various embodiments in which the invention may be practiced. It is to be understood that other embodiments may be utilized, and structural and functional modifications may be made without departing from the scope of the present invention.

FIGS. 1 and 2 depict, respectively, the underside and the outer side of an illuminated cover 10 in accordance with a preferred embodiment of the present invention. Cover 10 is depicted as a cover for a cellular telephone, and so has a number of openings through it. These include an opening 14 for a visual display, an opening 16 for a loud speaker, and an opening 18 for a microphone. As typical in a cellular telephone, a number of openings 20 are provided for control keys such as number keys and * and # keys. Additionally, several openings 22 are provided for various other control keys, such as a key to permit scrolling of a display visible through opening 14 and a key for selection of a highlighted item on such a display. In FIG. 1, cover 10 is depicted as having a ridge 14a–22a surrounding each of the openings 14–22; however, it is not necessary that a ridge be formed around each opening, generally ridges surrounding at least two of the openings are sufficient. In FIG. 2, cover 10 is depicted as having a graphic 52, but such a graphic may be omitted it desired.

Figure 4:
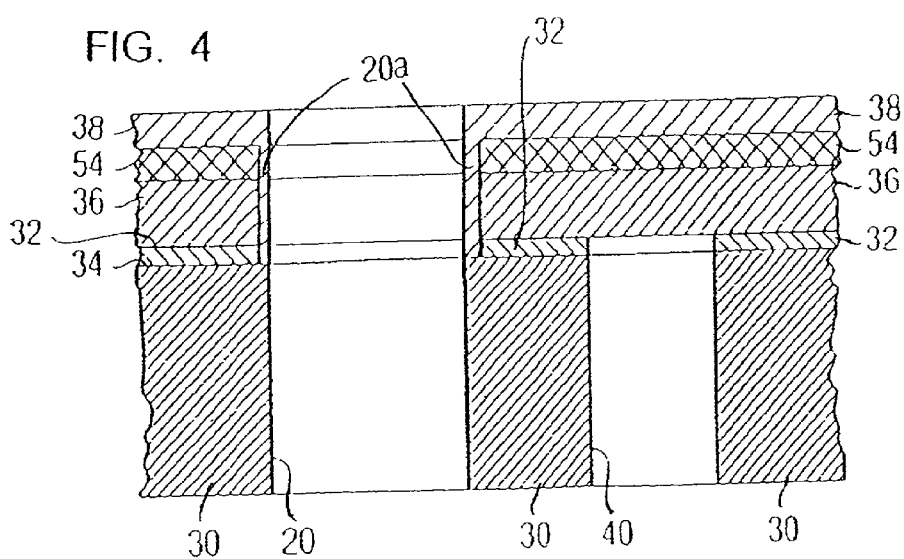
FIG. 4 is an enlarged fragmentary view taken along line 3—3 in FIG. 1 and depicting a second embodiment of an illuminated cover in accordance with the present invention.

As can be seen in FIG. 3, illuminated cover 10 includes a thin rigid support base 30. An electroluminescent foil 36 overlies a first surface 34 of support base 30, and an electrically insulating foil 38 overlies electroluminescent foil 36. Preferably, a graphic is provided between electroluminescent foil 36 and electrically insulating foil 38. By way of example, the graphic might be printed on the underside of electrically insulating foil 38 or on the upper surface of electroluminescent foil 36. Alternatively, as illustrated in FIG. 4, the graphic might be provided on a separate graphic foil 54 which is positioned between electrically insulating foil 38 and the electroluminescent foil 36. If the graphic would be damaged by heat during manufacture of illuminated cover 10, then a thermally insulating foil 32 can be provided between support base 30 and electroluminescent foil 36 to protect the graphic from the heat.

As can be seen in FIGS. 3 and 4, ridge 20a surrounds opening 20, extending from electrically insulating foil 38 through electroluminescent foil 36 and, if provided, thermally insulating foil 32 and graphic foil 54, but not through support base 30. Ridge 20a positions electroluminescent foil 36, thermally insulating foil 32, and graphic foil 54 on electrically insulating foil 38. Each of the other openings 14–22 through electrically insulating foil 38 may be surrounded by a similar ridge extending through the corresponding openings of electroluminescent foil 36, thermally insulating foil 32, and graphic foil 54, although it is not necessary that every opening be surrounded by such a ridge. Generally in this embodiment of the present invention it is sufficient if at least two of the openings have ridges surrounding them so as to accurately position electroluminescent foil 36, thermally insulating foil 32, and graphic foil 54 on electrically insulating foil 38.

By way of illustration, thin rigid support base 30 might have a thickness in the order of about 0.7 mm, thermally insulating foil 32 might have a thickness in the order of about 0.1 mm, electroluminescent foil might have a thickness in the order of about 0.3 mm, and electrically insulating foil 38 might have a thickness in the order of about 0.15 mm. The ridges 14a–22a preferably extend in the order of about 0.4 mm from the inner surface of electrically insulating foil 38 and have a width or thickness in the order of about 0.15; however, if a separate graphic foil 54 is included, then the ridges must extend enough to accommodate it. Preferably, the complete illuminated cover 10 has a thickness in the range of from about 1 mm to about 2 mm. Support base 30 can be of any suitable material such as, for example, an acrylonitrile—butadiene—styrene (ABS) terpolymer, polycarbonate (PC), an ABS-PC blend, or polymethyl methacrylatce. Electrically insulating foil 38 and thermally insulating foil 32 can be of any suitable flexible, appropriately insulating material such as, for example, polycarbonate. Electroluminescent foil 36 can be, for example, an electroluminescent film from Seiko Precision, Inc. The light provided by electroluminescent foil 36 might be white light or colored light, as preferred, either to enhance a graphic or to be attractive without a graphic.

Opening 20 passes through rigid support base 30, thermally insulating foil 32, and electroluminescent foil 36, as well as electrically insulating foil 38 and graphic foil 54, if provided, to permit passage of a control key from the telephone or other device covered by the illuminated cover. In addition, an opening 40 pases through rigid support base 30 and thermally insulating foil 32, exposing a portion of the surface of electroluminescent foil 36.

Figure 5:
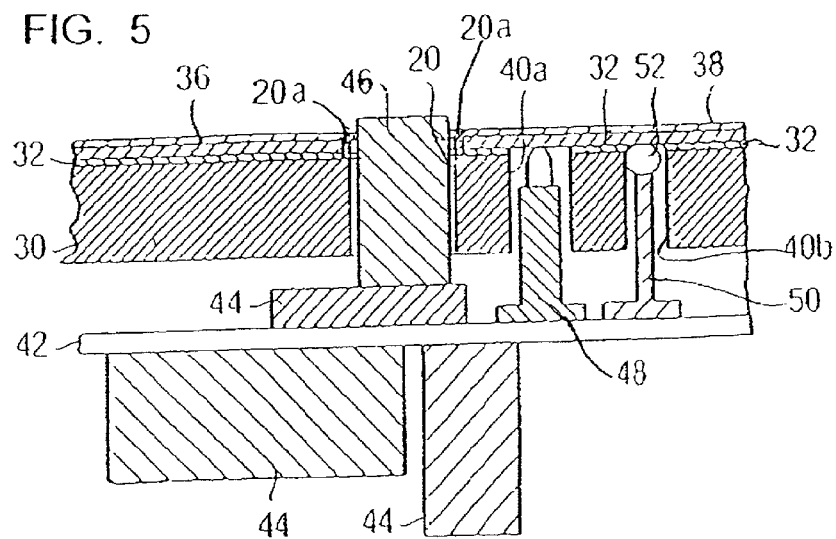
FIG. 5 is an enlarged fragmentary view taken along line 5—5 in FIG. 1, and depicting an embodiment of an illuminated cover in accordance with the present invention.

FIG. 5 illustrates illuminated cover 10 covering a printed circuit board 42 on which electronic components 44 are mounted, with a control key 46 extending through one opening 20. FIG. 5 illustrates two alternative forms of connectors to connect electroluminescent foil 36 with circuitry on printed circuit board 42. A spring biased connecting pin 48, such as a pogo pin, passes through opening 40a to connect electroluminescent foil 36 with circuitry on printed circuit board 42. An alternative type of connection can be provided by a connecting pin 50, the base of which contacts circuitry on printed circuit board 42 and the tip of which is connected to electroluminescent foil 36 by an electrically conductive adhesive 52. Other suitable connecting devices could, of course, be utilized. Printed circuit board 42, components 44, control key 46 and connectors 48, 50, together with additional similar elements make up an electronic device. Cover 10 cooperates with a second cover or base, such as base 58 depicted in FIG. 6, to enclose the electronic device to provide a covered electronic device.

FIG. 7 is a flowchart of a first embodiment of a method of manufacturing the illuminated cover of FIGS. 1 and 2 in accordance with the present invention. In a first step S1, a graphic is provided on electrically insulating foil 38, for example by printing. In step S2, the electrically insulating foil with the graphic on it is preformed, including cutting the foil to the desired configuration, forming openings corresponding with openings 14–22, forming ridges 14a–22a as desired, and shaping the foil to the desired shape. In step S3, the electroluminescent foil 36 is cut to the desired configuration, and openings corresponding with openings 14–22 are formed. Then, in step S4, electroluminescent foil 36 is attached to electrically insulating foil 38 which has the graphic on it.

FIG. 8 is a flow chart of an alternative embodiment of this portion of the method of FIG. 7. In step S1A, the graphic is provided on electroluminescent foil 36, for example by printing. In step S2A, electrically insulating foil 38 is preformed, including cutting the foil to the desired configuration, forming openings corresponding with openings 14–22, forming ridges 14a–22a as desired, and shaping the foil to the desired shape. In step S3A, electroluminescent foil 36 with the graphic on it is cut to the desired configuration, and openings corresponding with openings 14–22 are formed. Then, in step S4A, electroluminescent foil 36 with the graphic on it is attached to electrically insulating foil 38.

Similarly, FIG. 9 is a flowchart of another alternative embodiment of this portion of the method of FIG. 7 in which the graphic is provided in foil 54. In step S1B, electrically insulating foil 38 is preformed, including cutting the foil to the desired configuration, forming openings corresponding with openings 14–22, forming ridges 14a–22a as desired, and shaping the foil to the desired shape. In step S2B, electroluminescent foil 36 is cut to the desired configuration, and openings corresponding with openings 14–22 are formed. In step S3B, electroluminescent foil 36 is attached to electrically insulating foil 38. In step S4B, graphic foil 54 is cut to the desired configuration, and openings corresponding with openings 12–22 are formed in it. Then, in step S4B', graphic foil 54 is attached to electroluminescent foil 36.

Returning to FIG. 7, in step S5, thermally insulating foil 32 is cut to the desired configuration, and openings corresponding with openings 14–22 and 40 are formed in it. The openings in electroluminescent foil 36, graphic foil 54 if provided, and thermally insulating foil 32 which correspond with openings 14–22 are slightly larger than the outside diameter of ridges 14a–22a, for example about 0.2 mm larger. If openings 14–22, and thus ridges 14a–22a, are non-circular, for example oval, then of course the corresponding openings in foils 32, 36, and 54 are of similar shape. In step S6, thermally insulating foil 32 is attached to electroluminescent foil 36. In step S7, the preliminary cover member is placed in a mold having bosses which correspond with openings 14–22 and 40 to provide corresponding openings in rigid support base 30. In step S8 plastic is injected into the mold to form thin rigid support base 30. In step S9 the molded cover is cooled, and in step S10 the molded cover is removed from the mold.

Thermally insulating foil 32 protects the decorative graphic from excess heat during the molding process.

Consequently, if the illuminated cover does not include a decorative graphic, thermally insulating foil 32 can be omitted. Likewise, if the graphic would not be damaged by heat, thermally insulating foil 32 can be omitted. In either of these situations, steps S5 and S6 are omitted from the flow chart of FIG. 7. Likewise, if no graphic is provided, steps S1, S5, and S6 are omitted from the flow chart of FIG. 7, while step S1A is omitted from the flowchart of FIG. 8, and steps S4B and S4B' are omitted from the flow chart of FIG. 9.

Electroluminescent foil 36 might be one single continuous piece so that the illuminated cover emits a single display of light of a single color. Alternatively, electroluminescent foil 36 may be provided in segments 56a, 56b, 56c, 56d, 56e, and 56f, as depicted in FIG. 2. Each segment requires it own connector pin 48 or 50, and thus its own opening 40. The several segments can be provided in various colors, rather than in a single color. Likewise, the several segments can be illuminated in sequence, rather than all at the same time. Segments could be provided in appropriate shapes and colors and with appropriate lighting sequences to provide animation when energized. Graphic 52 which is depicted in FIG. 2 is merely illustrative of the types of graphic that might be provided between electrically insulating foil 38 and electroluminescent foil 36.

If electroluminescent foil 36, thermally insulating foil 32, and graphic foil 54 can be easily positioned on electrically insulating foil 38, ridges 14a–22a might be omitted. FIG. 10 depicts the underside of such a device cover. Also, if openings can be formed in foils 36, 32, and 54 without significant risk of damage to the foils, the openings might be formed after these foils are attached to electrically insulating foil 38. FIG. 1 is a partial flowchart of such a method. In step S11, electrically insulating foil 38 is preformed, including cutting it to the desired configuration and shaping it to the desired shape. In step S12, electroluminescent foil 36 is attached to the electrically insulating foil. A graphic may have been provided between electrically insulating foil 38 and electroluminescent foil 36, as in the embodiments of FIGS. 7–9. If so, an opening 40 is formed in a thermally insulating foil 32 in step S13, and that foil is attached in step S14. Then, in step S15 openings 14–22 are formed in foils 32, 36, 54, and 38. Ridges 14a–22a are, of course, unnecessary. The rest of the method is as in FIG. 7, commencing with step S7. If the electroluminescent foil would be easily damaged by step S15 in which openings are formed, the openings might be formed in that foil in a separate step. FIG. 12 is a partial flowchart of such a method, which differs from the method of FIG. 11 by the addition of step S12A in which openings 14–22 are formed in electroluminescent foil 36. Step S13 may include forming openings 14–22 in thermally insulating foil 32, as well as opening 40, if desired. The openings formed in the electroluminescent foil in step S12A are preferably slightly larger than the openings formed in the electrically insulating foil and the graphic foil (if provided) in step S14 so as to avoid damage to the electroluminescent foil during step S15. While the methods of FIGS. 11 and 12 may not be as efficient as those of FIGS. 7–9, still they can produce a device cover in accordance with the present invention.

The present invention thus provides advantageous methods of forming device covers and advantageous device covers, as well as advantageous covered devices. Although the present invention has been described with reference to preferred embodiments, variations, alterations, and substitutions can be made and still the result will be within the scope of the invention.

What is claimed is:

1. A method of forming a device cover having a predetermined shape, said method comprising:

forming a preliminary cover member by attaching a first surface of an electroluminescent foil to a first surface of an electrically insulating foil, the electrically insulating foil having the predetermined shape and having at least one first opening and at least one second opening therethrough, the electroluminescent foil having at least one opening therethrough corresponding with the at least one first opening through the electrically insulating foil and the at least one second opening exposes a surface of the electroluminescent foil;

placing the preliminary cover member in a mold of the predetermined shape, the mold having bosses corresponding with the at least one first opening and with the at least one second opening; and injecting plastic into the mold and into contact with the preliminary cover member to form the device cover, the bosses providing opening is through the plastic corresponding with the at least one first opening and the at least one second opening so that when the mold is opened the at least one first opening extends through the device cover and the at least one second opening extends to the surface of the electroluminescent foil.

2. A method as claimed in claim 1, further comprising, before forming the preliminary cover member, preforming the electrically insulating foil to the predetermined shape and forming the at least one first opening through the electrically insulating foil.

3. A method as claimed in claim 2, wherein the preforming includes forming a ridge around the at least one first opening through the electrically insulating foil, and wherein the at least one first opening through the electroluminescent foil surrounds the ridge to position the electroluminescent foil on the electrically insulating foil.

4. A method as claimed in claim 1, further comprising, before forming the preliminary cover member, forming the at least one first opening through the electroluminescent foil.

5. A method as claimed in claim 1, wherein forming the preliminary cover member includes attaching the first surface of the electroluminescent foil to a first surface of an electrically insulating foil having a graphic thereon.

6. A method as claimed in claim 4, wherein forming the preliminary cover member includes attaching a thermally insulating foil to a second surface of the electroluminescent foil, the thermally insulating foil having openings therethrough corresponding with the at least one first opening and the at least one second opening.

7. A method as claimed in claim 1, further comprising, before forming the preliminary cover member, providing a graphic on the first surface of the electrically insulating foil.

8. A method as claimed in claim 7, wherein forming the preliminary cover member includes attaching a thermally insulating foil to a second surface of the electroluminescent foil, the thermally insulating foil having openings therethrough corresponding with the at least one first opening and the at least one second opening.

9. A method as claimed in claim 1, further comprising, before forming the preliminary cover member, providing a graphic on the electroluminescent foil.

10. A method as claimed in claim 9, wherein forming the preliminary cover member includes attaching a thermally insulating foil to a second surface of the electroluminescent foil, the thermally insulating foil having openings therethrough corresponding with the at least one first opening and the at least one second opening.

11. A method as claimed in claim 1, wherein forming the preliminary cover member includes positioning a further foil between the electrically insulating foil and the electroluminescent foil, the further foil having a graphic on a surface thereof, the further foil attaching the electroluminescent foil to the electrically insulating foil.

12. A method as claimed in claim 11, wherein forming the preliminary cover member includes attaching a thermally insulating foil to a second surface of the electroluminescent foil, the thermally insulating foil having openings therethrough corresponding with the at least one first opening and the at least one second opening.

13. A method as claimed in claim 1, further comprising:
allowing the plastic to cool; and
removing the decorative cover from the mold.

14. A method of forming a device cover having a predetermined shape, said method comprising:
forming a preliminary cover member by attaching a first surface of an electroluminescent foil to a first surface of an electrically insulating foil, the electrically insulating foil having the predetermined shape, the electroluminescent foil having at least one first opening therethrough;
forming at least one first opening through the electrically insulating foil at a location corresponding with the at least one first opening through the electroluminescent foil and at least one second opening therethrough;
placing the preliminary cover member in a mold of the predetermined shape, the mold having bosses corresponding with the at least one first opening and with the at least one second opening; and
injecting plastic into the mold and into contact with the preliminary cover member to form the device cover, the bosses providing opening through the plastic corresponding with the at least one first opening and the at least one second opening so that when the mold is opened, the at least one first opening extends through the device cover and the at least one second opening extends to the surface of the electroluminescent foil.

15. A method as claimed in claim 14, further comprising, before forming the preliminary cover member, preforming the electrically insulating foil to the predetermined shape.

16. A method as claimed in claim 14, further comprising, before forming the preliminary cover member, forming the at least one first opening and the at least one second opening through the electroluminescent foil.

17. A method as claimed in claim 14, wherein forming the preliminary cover member includes attaching the first surface of the electroluminescent foil to a first surface of an electrically insulating foil having a graphic thereon.

18. A method as claimed in claim 17, wherein forming the preliminary cover member includes attaching a thermally insulating foil to a second surface of the electroluminescent foil, the thermally insulating foil having at least one first opening and at least one second opening therethrough corresponding with the at least one first opening and the at least one second opening.

19. A method as claimed in claim 14, further comprising, before forming the preliminary cover member, providing a graphic on the first surface of the electrically insulating foil.

20. A method as claimed in claim 19, wherein forming the preliminary cover member includes attaching a thermally insulating foil to a second surface of the electroluminescent foil, the thermally insulating foil having at least one first opening and at least one second opening therethrough corresponding with the at least one first opening and the at least one second opening.

21. A method as claimed in claim 14, further comprising, before forming the preliminary cover member, providing a graphic on the electroluminescent foil.

22. A method as claimed in claim 21, wherein forming the preliminary cover member includes attaching a thermally insulating foil to a second surface of the electroluminescent foil, the thermally insulating foil having at least one first opening and at least one second opening therethrough corresponding with the at least one first opening and the at least one second opening.

23. A method as claimed in claim 14, wherein forming the preliminary cover member includes positioning a further foil between the electrically insulating foil and the electroluminescent foil, the further foil having a graphic on a surface thereof.

24. A method as claimed in claim 23, wherein forming the preliminary cover member includes attaching a thermally insulating foil to a second surface of the electroluminescent foil, the thermally insulating foil having at least one first opening and at least one second opening therethrough corresponding with the at least one first opening and the at least one second opening.

25. A method as claimed in claim 14, further comprising:
allowing the plastic to cool; and
removing the decorative cover from the mold.

* * * * *